(12) United States Patent
Wang et al.

(10) Patent No.: US 11,085,829 B2
(45) Date of Patent: Aug. 10, 2021

(54) INFRARED TEMPERATURE-MEASUREMENT PROBE

(71) Applicant: UNIVERSITY OF ELECTRONIC SCIENCE AND TECHNOLOGY OF CHINA, Chengdu (CN)

(72) Inventors: Chao Wang, Chengdu (CN); Yang Yang, Chengdu (CN); Jing Jiang, Chengdu (CN); Chengui Zhang, Chengdu (CN); Zezhan Zhang, Chengdu (CN); Fei Wang, Chengdu (CN); Ying Duan, Chengdu (CN); Jun Hu, Chengdu (CN); Yueming Wang, Chengdu (CN); Hongchuan Jiang, Chengdu (CN); Huiyuan Geng, Chengdu (CN); Jiexiong Ding, Chengdu (CN); Li Du, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 379 days.

(21) Appl. No.: 15/950,143

(22) Filed: Apr. 10, 2018

(65) Prior Publication Data
US 2018/0364103 A1     Dec. 20, 2018

(30) Foreign Application Priority Data
Jun. 19, 2017 (CN) .................. 2017104646053.X

(51) Int. Cl.
| | |
|---|---|
| *G01J 5/00* | (2006.01) |
| *G01J 5/08* | (2006.01) |
| *G01J 5/02* | (2021.01) |
| *F01D 21/00* | (2006.01) |
| *G01J 5/04* | (2006.01) |
| *G02B 7/182* | (2006.01) |
| *G01J 5/02* | (2021.01) |
| *G01J 5/06* | (2006.01) |

(52) U.S. Cl.
CPC .......... *G01J 5/0809* (2013.01); *F01D 21/003* (2013.01); *G01J 5/0088* (2013.01);
(Continued)

(58) Field of Classification Search
CPC .. G01J 3/0202; G01J 3/027; G01J 5/04; G01J 3/4535; G01J 5/025; G01J 5/026;
(Continued)

(56) References Cited

U.S. PATENT DOCUMENTS 2,951,944 A * 9/1960 Fong .................. F25D 19/006
                                                  250/352
3,230,376 A * 1/1966 Goetze ................. G01S 3/782
                                                  250/203.1
(Continued)

FOREIGN PATENT DOCUMENTS

DE        60314307 T2 *  9/2007 ........... F01D 21/003
JP        357132030 A  *  8/1982

*Primary Examiner* — Gail Kaplan Verbitsky
(74) *Attorney, Agent, or Firm* — Matthias Scholl P.C.; Matthias Scholl

(57) ABSTRACT

An infrared temperature-measurement probe, including: a probe housing; a reflector; and a reflector adjusting mechanism. The probe housing includes an inner wall, an outer wall, a cooling channel sandwiched between the inner wall and the outer wall, a chamber surrounded by the inner wall, and a light transmission hole communicating with the chamber. The reflector includes a mirror and a mirror frame. The reflector adjusting mechanism includes a motion controller, a drive coupling, and three control rods. The reflector and the three control rods are disposed in the chamber of the probe housing. The motion controller is disposed outside the chamber of the probe housing. The drive coupling is disposed between the motion controller and the three control rods, and the motion controller is adapted to move each of the three control rods via the drive coupling. The mirror is imbedded in and is supported by the mirror frame.

5 Claims, 3 Drawing Sheets

(52) U.S. Cl.
CPC .............. *G01J 5/0205* (2013.01); *G01J 5/04* (2013.01); *G01J 5/089* (2013.01); *G01K 13/00* (2013.01); *G02B 7/1827* (2013.01); *F05D 2270/303* (2013.01); *F05D 2270/80* (2013.01); *G01J 5/061* (2013.01)

(58) Field of Classification Search
CPC .......... G01J 5/047; G01J 5/084; G01J 5/0022; G01J 5/0088; G01J 2005/0077; G01J 2005/0081; G01J 5/0896; G01J 5/08; G01J 5/00; G01J 2005/0066; G01J 5/0014; G01J 2005/0085; G01J 5/0066; G01K 13/08; G01K 13/02; G01N 2291/2693; G01N 21/8851; G01N 29/0654
USPC .............. 374/120, 121, 141, 208, 152, 144; 702/135
See application file for complete search history.

(56) References Cited

U.S. PATENT DOCUMENTS

| | | | | |
|---|---|---|---|---|
| 4,582,426 A * | 4/1986 | Douglas | ................ | F01D 17/085 356/43 |
| 4,847,878 A * | 7/1989 | Badeau | ................ | G01D 5/266 377/19 |
| 4,854,687 A * | 8/1989 | Fletcher | ............... | G02B 7/1827 359/223.1 |
| 4,867,574 A * | 9/1989 | Jenkofsky | ................ | G01J 5/02 374/121 |
| 6,036,360 A * | 3/2000 | Takata | ................ | G01J 5/0893 374/124 |
| 6,698,920 B1 * | 3/2004 | Maylotte | ............. | G02B 6/3504 374/130 |
| 8,414,136 B2 * | 4/2013 | Kudo | ...................... | B60R 1/072 359/841 |
| 8,901,502 B2 * | 12/2014 | Sinn | ....................... | G01N 21/64 250/364 |
| 10,231,647 B2 * | 3/2019 | Kostic | ....................... | G01J 5/00 |
| 2003/0187132 A1 * | 10/2003 | Hodgkinson | .......... | G01K 13/08 524/588 |
| 2003/0222218 A1 * | 12/2003 | Nozu | ....................... | G01J 5/16 250/338.1 |
| 2006/0226366 A1 * | 10/2006 | Tanaka | .................... | G01J 5/061 250/338.1 |
| 2010/0024408 A1 * | 2/2010 | Pollington | ................ | F01N 3/02 60/320 |
| 2012/0217422 A1 * | 8/2012 | Yabu | ..................... | H05G 2/006 250/504 R |
| 2019/0003893 A1 * | 1/2019 | Wang | .................... | F01D 21/003 |
| 2020/0182700 A1 * | 6/2020 | Farahbod-Sternahl | ..................... | G01J 5/029 |

* cited by examiner

INFRARED TEMPERATURE-MEASUREMENT PROBE

CROSS-REFERENCE TO RELATED APPLICATIONS

Pursuant to 35 U.S.C. § 119 and the Paris Convention Treaty, this application claims foreign priority to Chinese Patent Application No. 201710464605.X filed Jun. 19, 2017, the contents of which and any intervening amendments thereto are incorporated herein by reference.

BACKGROUND OF THE INVENTION

Field of the Invention

The present invention relates to a probe for infrared temperature measurement, more specifically, relates to a probe for infrared temperature measurement used in an aviation turbine engine.

Description of the Related Art

Infrared temperature measurement has been widely used in detecting the temperatures on the surfaces of the turbine blades of an aviation turbine engine. Traditional infrared temperature-measurement probes include a fixed reflector, so that the radiation information of the entire blade cannot be accurately collected. In addition, impurities tend to accumulate on the reflective mirror of the reflector, and high-temperature gas in the turbine engine tends to damage the reflective mirror of the reflector. This reduces the accuracy and reliability of the temperature-measurement probes.

SUMMARY OF THE INVENTION

In view of the above-described problems, it is one objective of the invention to provide an infrared temperature-measurement probe that is efficient and accurate in in detecting the temperatures on the surfaces of the turbine blades without damaging the reflector.

To achieve the above objective, in accordance with one embodiment of the invention, there is provided an infrared temperature-measurement probe, comprising: a probe housing, the probe housing comprising an inner wall, an outer wall, a cooling channel sandwiched between the inner wall and the outer wall, a chamber surrounded by the inner wall, and a light transmission hole communicating with the chamber; a reflector, the reflector comprising a mirror and a mirror frame; and a reflector adjusting mechanism, the reflector adjusting mechanism comprising a motion controller, a drive coupling, and three control rods.

The reflector and the three control rods are disposed in the chamber of the probe housing; the motion controller is disposed outside the chamber of the probe housing; the drive coupling is disposed between the motion controller and the three control rods, and the motion controller is adapted to move each of the three control rods via the drive coupling; each of the three control rods is movable; the mirror is imbedded in and supported by the mirror frame; the mirror frame comprises ball joints, and the three control rods are connected to the mirror frame via the ball joints; the outer wall of the probe housing comprises a first cold gas intake communicating with the cooling channel.

In a class of one embodiment, the motion controller is a servo motor.

In a class of one embodiment, the outer wall comprising an inner surface facing the cooling channel, and the inner surface is provided with a plurality of ridges.

In a class of one embodiment, the light transmission hole is a gap of the probe housing and corresponds to the reflector, the cooling channel comprises openings communicating with the gap, and the openings are cold gas outlets.

In a class of one embodiment, a distance between the inner wall and the outer wall corresponding to the openings is less than a height of the cooling channel.

In a class of one embodiment, the probe housing further comprises a second cold gas intake communicating with the chamber of the probe housing.

Advantages of the infrared temperature-measurement probe according to embodiments of the disclosure are summarized as follows. The probe comprises a probe housing, a reflector, and a reflector adjusting mechanism. The reflector is adjustable to have different orientations with respect to the turbine blade by respectively moving the three control rods (the motions of the three control rods are independent from each other), such that all infrared radiations of the blade are capable of being reflected by the mirror of the reflector for temperature calculation. Therefore, the probe of the invention is highly accurate in detecting the temperatures on the blade. In addition, the distance between the inner wall and the outer wall corresponding to the openings of the probe housing is less than the height of the cooling channel, so that the cold gas is sprayed out of the openings and flows towards to the reflector, which is conducive to sweeping off the impurities accumulated on the reflector, improving the measurement accuracy.

Figure 1:
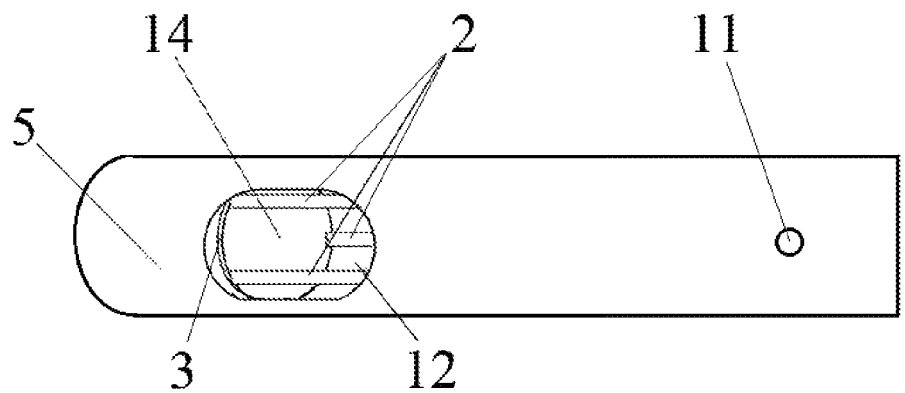
FIG. 1 is a stereogram of an infrared temperature-measurement probe in accordance with one embodiment of the disclosure.
Figure 2:
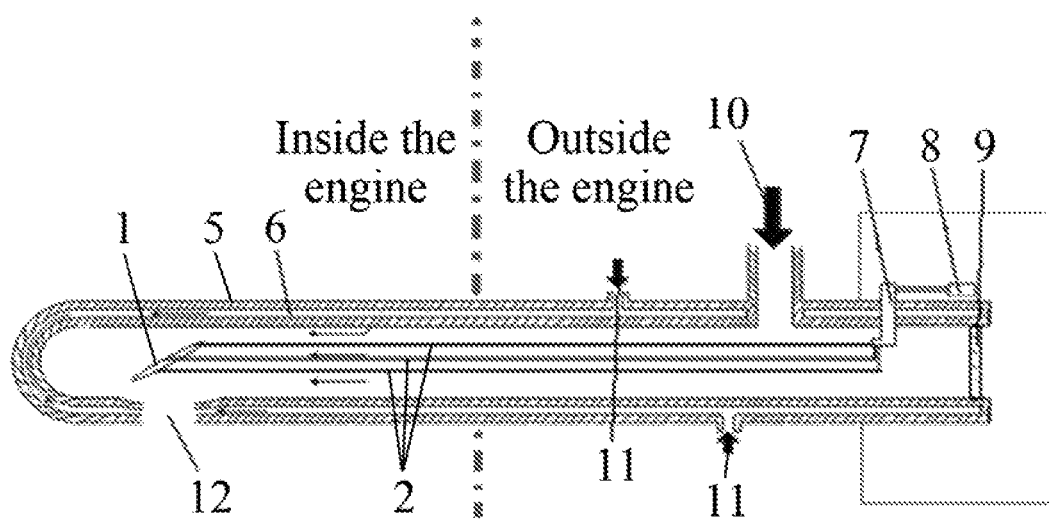
FIG. 2 is a sectional view of an infrared temperature-measurement probe in accordance with one embodiment of the disclosure.
Figure 3:
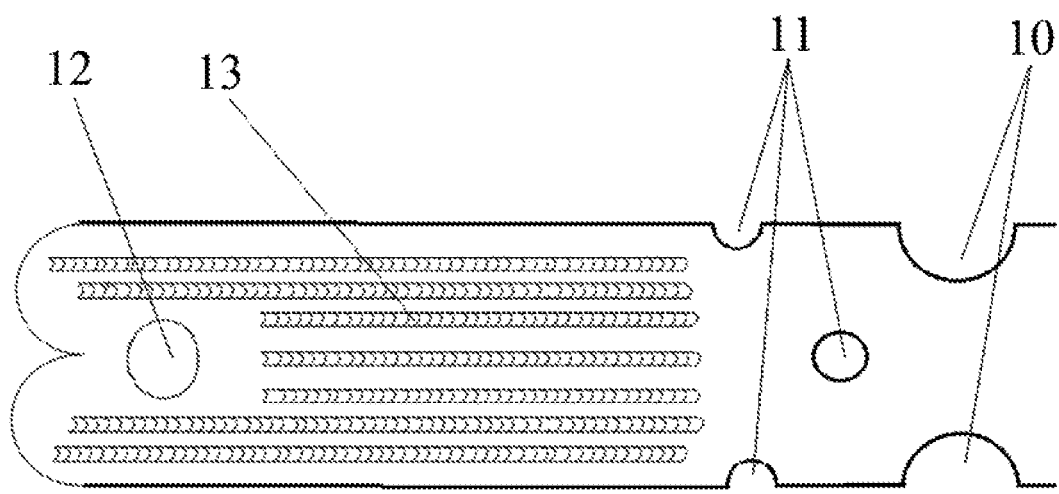
FIG. 3 is a perspective view of an outer wall of an infrared temperature-measurement probe in accordance with one embodiment of the disclosure.
Figure 4:
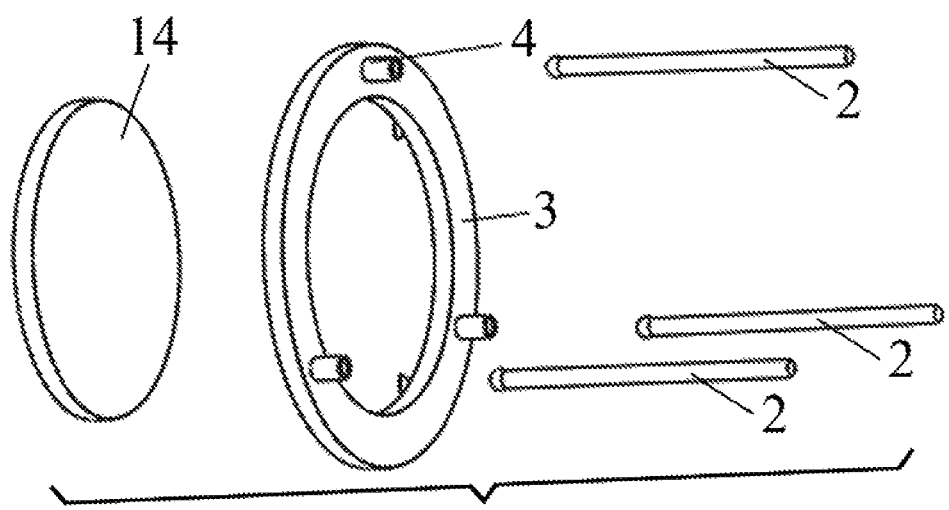
FIG. 4 is an exploded view of a reflector of an infrared temperature-measurement probe in accordance with one embodiment of the disclosure.
Figure 5:
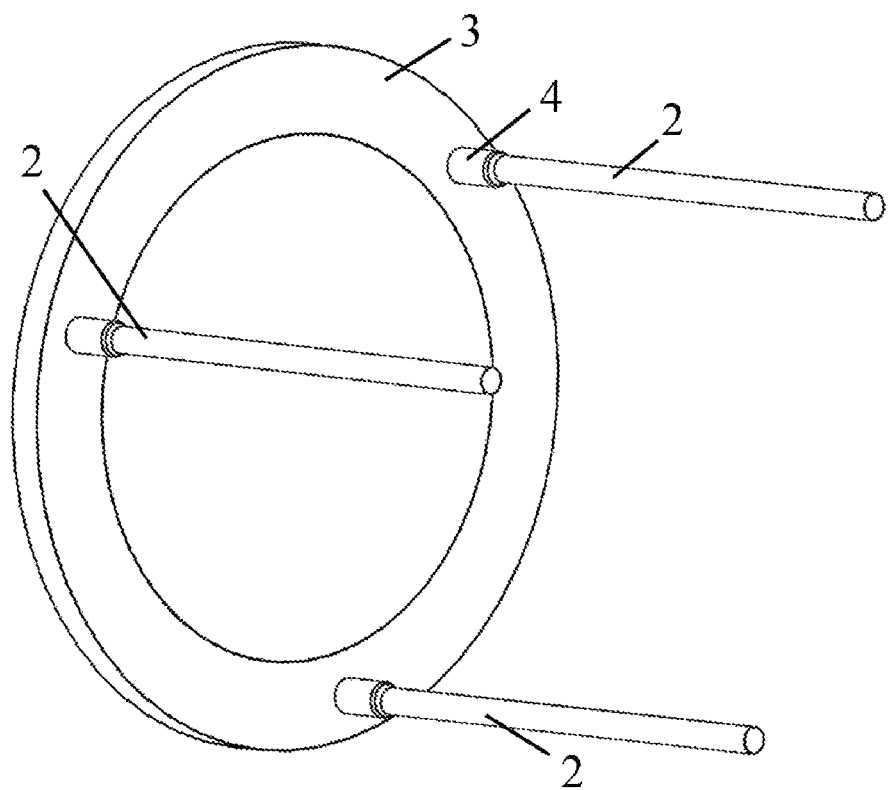
FIG. 5 is a schematic diagram of a reflector of an infrared temperature-measurement probe in accordance with one embodiment of the disclosure.

In the drawings, the following reference numbers are used: 1. Reflector; 2. Control rod; 3. Mirror frame; 4. Ball joint; 5. Probe housing; 6. Cooling channel; 7. Drive coupling; 8. Servo motor; 9. Transparent window; 10. Second cold gas intake; 11. First cold gas intake; 12. Light transmission hole; 13. Ridge; 14. Mirror.

DETAILED DESCRIPTION OF THE EMBODIMENTS

As shown in FIG. 1, an infrared temperature-measurement probe comprises a probe housing 5, a reflector 1, a reflector adjusting mechanism. The probe housing comprises an inner wall, an outer wall, a cooling channel 6 sandwiched between the inner wall and the outer wall, a chamber surrounded by the inner wall, and a light transmission hole communicating with the chamber. The reflector adjusting mechanism comprises a motion controller, a drive coupling, and three control rods 2.

The motion controller is a servo motor 8. The diameter of the reflector 1 is 15 mm and its deflection angle is determined by the three control rods. The reflector is flexible and configured to collect the radiant energy of the turbine blade. The three control rods are controlled by the servo motor 8 and their cooperative movement regulates the deflection of the reflector. The reflector comprises a mirror and a mirror frame 3. The mirror is fixed and protected by the mirror frame 3.

As shown in FIGS. 2-5, the drive coupling is disposed between the motion controller and the three control rods, and the motion controller is adapted to move each of the three control rods via the drive coupling 7. The mirror frame comprises ball joints 4, and the three control rods are connected to the mirror frame via the ball joints 4. The connection method ensures that the reflector can be easily removed from the probe when it is necessary. The ball joints 4 are made from steel and are installed on the surface of the mirror frame. The outer wall of the probe housing comprises a first cold gas intake 11 communicating with the cooling channel 6. The spacing between the two walls is 5 mm wide. The double-wall structure ensures the reliable protection for the mirror inside the probe housing. The temperature of the mirror can be reduced by at least 300 k compared with the ambient temperature.

The diameter of the cold gas intake is 8 mm. The cold high pressure gas in the cooling channel can protect the reflector from the damage of the impurity and the high temperature combustion gas in the combustion chamber. The cold high pressure gas flows in the cooling chamber between the inner wall and the outer wall of the probe housing.

The outer wall comprises an inner surface facing the cooling channel, and the inner surface is provided with a plurality of ridges 13. The plurality of ridges 13 are different in length, and configured to guide the cold high pressure gas to the entire probe housing. The drive coupling is made of copper.

The servo motor is disposed outside the chamber of the probe housing and is positioned at the tail of the probe, preventing the interference with the optical path. A transparent window 9 is disposed at the tail of the probe to increase the brightness, and the deflection direction of the reflector can be observed through the transparent window.

The light transmission hole 12 is a gap of the probe housing and corresponds to the reflector, the cooling channel comprises openings communicating with the gap, and the openings are cold gas outlets. The distance between the inner wall and the outer wall corresponding to the openings is less than the height of the cooling channel, so that the cold gas is sprayed out of the openings and flows towards to the reflector, which is conducive to sweeping off the impurities accumulated on the reflector, improving the measurement accuracy. The probe housing further comprises a second cold gas intake 10 communicating with the chamber of the probe housing, further reducing the work temperature of the reflector, prolonging the service life of the probe.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A probe for reflecting an infrared radiation of blades of an engine to an external device for an infrared temperature calculation, the probe comprising:
   a probe housing, the probe housing comprising an inner wall, an outer wall, a first gas intake and a second gas intake for taking in cooling gas, and a through hole;
   a reflector, the reflector comprising a mirror and a mirror frame; and
   a reflector adjusting mechanism, the reflector adjusting mechanism comprising a motion controller, a drive coupling, and three control rods, the drive coupling comprising a first drive coupling end and a second drive coupling end, and each of the three control rods comprising a first control rod end and a second control rod end;

wherein:
   the probe housing is in a cylindrical shape comprising a cylindrical chamber, a closed end, and an open end;
   an inner chamber is formed between the outer wall and the inner wall;
   the through hole is in the vicinity of the closed end and extends through the outer wall and the inner wall;
   the first gas intake communicates with the inner chamber;
   the second gas intake communicates with the cylindrical chamber;
   the reflector and the three control rods are disposed in the cylindrical chamber;
   the motion controller is disposed outside the probe housing;
   the mirror is imbedded in and supported by the mirror frame;
   the mirror frame comprises three ball joints, and the first control rod ends of the three control rods are connected to the mirror frame via the three ball joints, respectively;
   the drive coupling is disposed through the probe housing;
   the first drive coupling end is disposed inside the cylindrical chamber and is connected to the second control rod ends of the three control rods;
   the second drive coupling end is disposed outside the probe housing and is connected to the motion controller; and
   the motion controller is adapted to move each of the three control rods via the drive coupling;
when in use:
   the closed end of the probe is disposed into an engine and the open end of the probe is disposed outside the engine;
   cooling gas is supplied into the first gas intake and the second gas intake, thereby cooling the probe; and
   when an infrared radiation generated by blades of the engine passes through the through hole into the cylindrical chamber, the three control rods are moved via the drive coupling and an angle of the mirror is adjusted with respect to the through hole, thereby reflecting the infrared radiation by the mirror to pass through the open end of the probe and towards an external device for an infrared temperature calculation.

2. The probe of claim 1, wherein the motion controller is a servo motor.

3. The probe of claim 1, wherein the outer wall comprising an inner surface facing the inner chamber, and the inner surface is provided with a plurality of ridges.

4. The probe of claim 1, wherein:
  an open gap is formed between the outer wall and the inner wall at the through hole, and the inner chamber communicates with the through hole through the open gap; and
  the reflector is configured to face the through hole.

5. The probe of claim 1, further comprising a cover, wherein:
  the cover is disposed on the open end; and
  the cover is transparent.

\* \* \* \* \*